United States Patent [19]

Reynolds

[11] 4,158,397
[45] Jun. 19, 1979

[54] BASIC CYCLECAR FRAME

[76] Inventor: Richard F. Reynolds, 52 Springdale St., Malden, Mass. 02148

[21] Appl. No.: 867,693

[22] Filed: Jan. 9, 1978

[51] Int. Cl.$^2$ ............................................. B62D 61/06
[52] U.S. Cl. .................................... 180/25 A; 180/11; 280/7.1; 403/262
[58] Field of Search ...................... 180/25 R, 25 A, 11, 180/16; 403/262; 280/7.1

[56] References Cited

U.S. PATENT DOCUMENTS

| | | | |
|---|---|---|---|
| 1,933,102 | 10/1933 | DuPont | 180/25 R |
| 3,419,098 | 12/1968 | Mayers | 180/25 R |
| 3,460,628 | 8/1969 | Tankersley | 403/262 X |

FOREIGN PATENT DOCUMENTS

| | | | |
|---|---|---|---|
| 178544 | 10/1953 | Austria | 180/25 R |
| 533078 | 2/1922 | France | 180/25 R |
| 400542 | 12/1942 | Italy | 180/25 R |
| 545049 | 8/1956 | Italy | 180/25 R |
| 12842 of | 1914 | United Kingdom | 180/25 R |

*Primary Examiner*—John P. Silverstrim

[57] ABSTRACT

The invention discloses a vehicle frame to be attached to the frame of a conventional two-wheeled motorcycle whose front wheel and fork have been removed, resulting in a combined structure of considerable integrity which may then be utilized as a basis for the construction of a three-wheeled vehicle commonly known as a cyclecar, said vehicle frame being of sufficiently general configuration to allow the builder considerable latitude in the choice of components necessary for the completion of the cyclecar.

2 Claims, 3 Drawing Figures

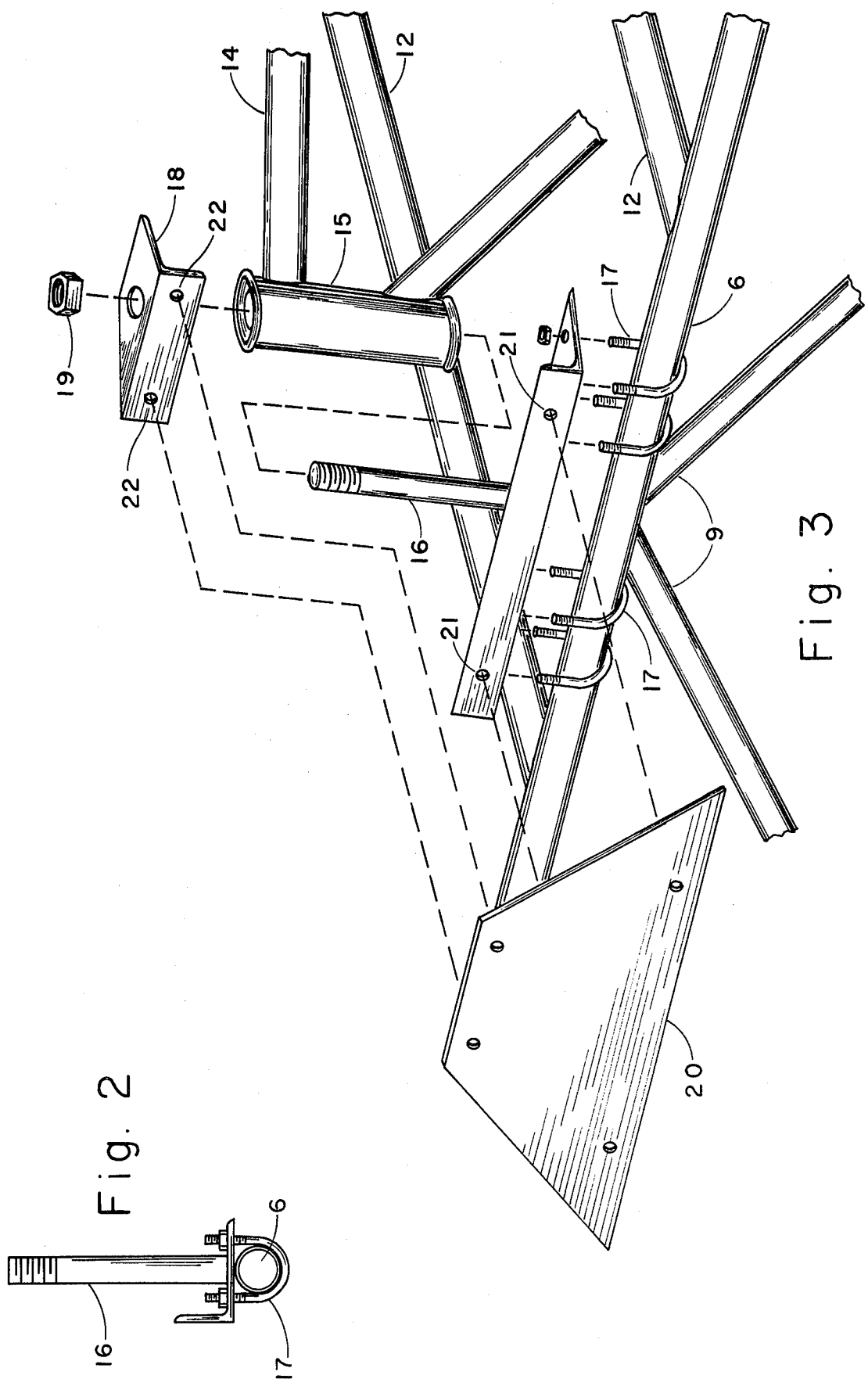

BASIC CYCLECAR FRAME

BACKGROUND OF INVENTION

The invention relates to certain three-wheeled motor vehicles having two front wheels and one rear wheel, which may be constructed from conventional two-wheeled motorcycles. These vehicles incorporate two steerable front wheels which are attached to a framework which is attached to the front of a conventional motorcycle whose front wheel and fork have been removed. The passengers are supported by this framework at a point in front of the motorcycle involved. Since such an arrangement constitutes, for all practical purposes, a small, rear-engined automobile, having merely one rear wheel rather than two, these vehicles have often been referred to as cyclecars. They will therefore occasionally be referred to as cyclecars in this document.

There have been scattered attempts to produce such a vehicle. All of these attempts, however, have been geared toward the production of a complete vehicle, incorporating a specific front suspension, a specific steering system, and a frame whose configuration dictated a specific body shape. This production of a complete vehicle naturally results in a relatively high cost for the finished product, making its purchase somewhat prohibitive. The designation of specific components allows a potential builder no latitude in the alteration of the design and consequently, the control of production costs.

Structurally, all of these previous attempts have utilized a connection between the motorcycle fork neck and the upper rear portion of the cyclecar frame as the one principal connection between the two structures. They have then provided secondary connections between the lower rear cyclecar frame and the lower front motorcycle frame. This arrangement invariably results in an inordinate amount of stress on the motorcycle fork neck. The secondary connections cannot always be utilized as there are several motorcycles commonly in use in which the engine serves as a frame member, the motorcycle thereby having no lower front frame portion.

In spite of all previous attempts to produce a workable cyclecar, there exists little activity in this field. There remain, however, various individuals within the multitude of motorcycle enthusiasts, who might wish to make the conversion to a cyclecar, if given the opportunity to do so easily and economically. Included might be those cyclists who desire a more stable and weather-resistant vehicle that they could utilize during the winter months; those who would prefer a small economy automobile, but opted for the motorcycle for economic reasons; and, in conjunction with the current interest in the customizing of motorcycles, those who are seeking a measure of individuality.

SUMMARY OF INVENTION

The object of the invention is to provide a basic cyclecar frame which may be rigidly attached to the front of a conventional two-wheeled motorcycle, the front wheel and fork of which have been removed, the resulting combination then forming a structure of considerable integrity which may be utilized as a basis for the construction of a cyclecar. This cyclecar frame shall be of sufficiently general configuration to allow the builder considerable latitude in his choice of the remaining vehicle components, such as front suspension, steering gear, body, and seating. It is a further object that this cyclecar frame be of such design, dimension, and light weight coupled with structural integrity, that it be easily adaptable to the vast majority of motorcycles currently in use, regardless of size.

The invention therefore reveals a tapered, box-shaped frame, whose members are constructed of metallic tubing. All rectangular sections and adjoining members of this box-frame are diagonally braced, resulting in a type of structure commonly known as a space-frame The box-shaped space-frame with its multiple tubing members provides a very general configuration with an infinite number of mounting points to which the remaining vehicle components may be attached with standard U-bolts. The four front corners of the box-frame embody mounting tabs to be utilized for the attachment of any members, brackets, or sub-frames necessary to the front suspension.

Projecting horizontally rearward from the upper rear crossmember of this box-frame are two parallel members, forming a fork into which the motorcycle being utilized fits. The fork neck and top rear section of the motorcycle frame are then attached respectively to the upper rear crossmember and fork of the cyclecar frame with the aid of special connecting members. These two principal connections between the two vehicle sections provide complete rigidity in all planes and directions, resulting in an integrity of the total structure heretofore unknown in such a vehicle. The design of the frame and the connecting members provides a variable-position mounting system which makes the frame readily adaptable to the vast majority of motorcycles currently in use, while requiring no permanent alterations such as cutting, drilling, or welding, to the motorcycle frame. The variable-position mounting allows the builder, if desired, an extremely low center of gravity, well below the hub level of a typical motorcycle wheel.

The space-frame construction couples such light weight with such a high degree of structural integrity, that the one frame may be utilized with the lighter as well as the heaviest and most powerful motorcycles, allowing the builder his choice of an economy or a high-performance vehicle. Unlike previous cyclecars utilizing centerline frames which necessitate a structural member running through the interior of the vehicle, the space-frame construction allows a maximum of unrestricted interior space by placing all structural members in the planes which form the outer surfaces of the structure. The box-shaped space-frame also provides a safer structure by more fully enclosing the passengers within main structural members.

A greater appreciation of the design and advantages of the aforementioned basic cyclecar frame may be gained through a consideration of the following drawings and their detailed description.

BRIEF DESCRIPTION OF DRAWINGS

FIG. 2 is a sectional view through the upper rear crossmember showing its relationship to the front connecting member.

FIG. 3 is an exploded partial perspective view showing the special front connection between the upper rear crossmember of the cyclecar frame and the fork neck of the motorcycle frame.

DETAILED DESCRIPTION OF DRAWINGS

Figure 1:
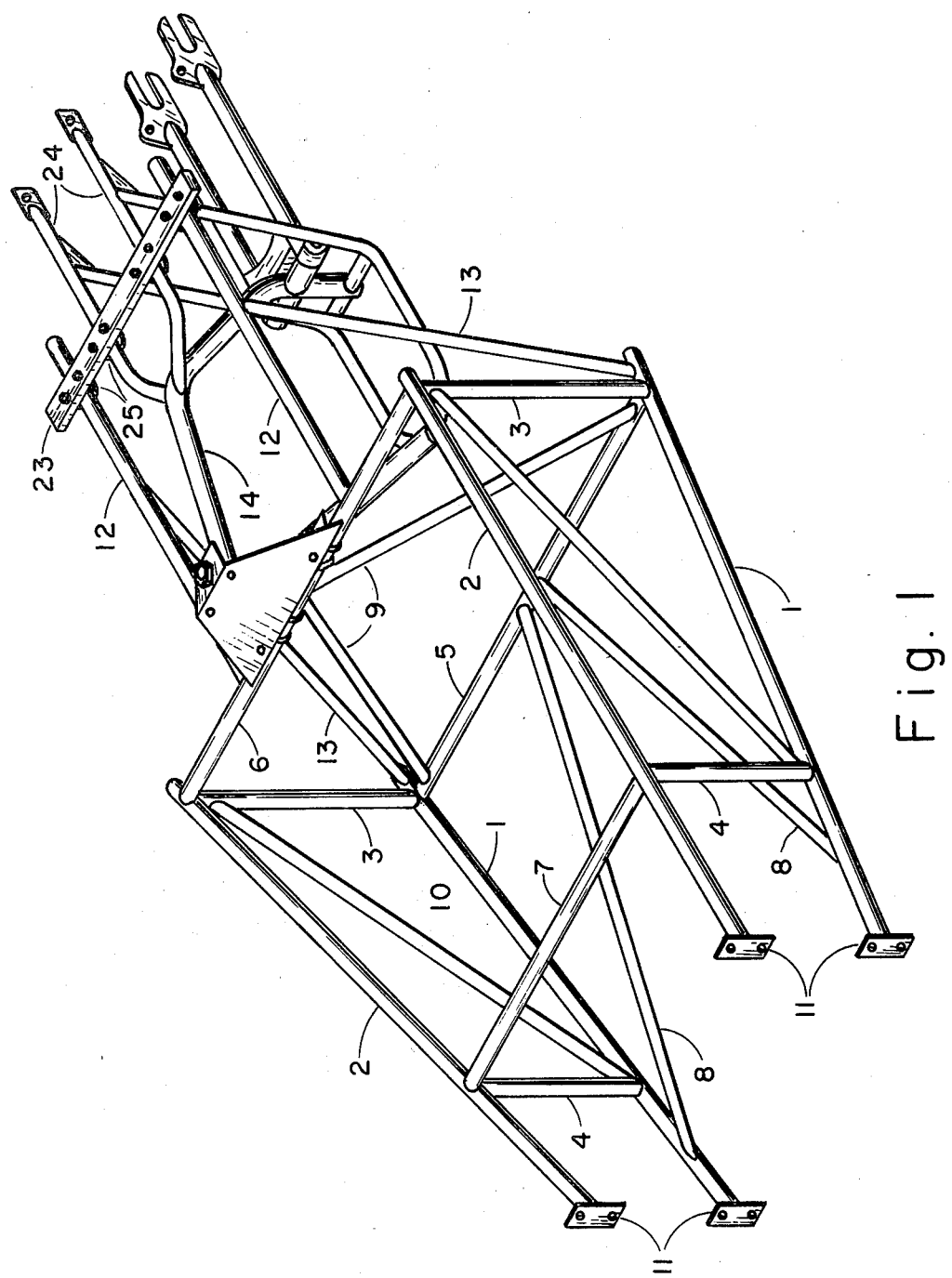
FIG. 1 is a perspective view of the basic cyclecar frame attached to a typical medium-sized motorcycle frame.

Referring to FIG. 1, an appreciation of the approximate dimensions of the cyclecar frame and the connecting members may be gained by a comparison with the typical medium-sized motorcycle frame to which they are attached. The frame shall be constructed of round metallic tubing, preferably steel, with welded joints, the ends of members being notched where necessary to fit adjoining members. Bracing members shall be of slightly smaller diameter than main members.

Referring to FIG. 1, the cyclecar frame employs two lower longitudinal members or frame rails 1 lying side by side in the same horizontal plane and disposed such that they taper slightly from rear to front. Lying in the same vertical planes as and directly above 1 are two upper longitudinally members or frame rails 2 which slope slightly downward from rear to front. These four longitudinal members then determine the tapered-box-shape of the main section of the frame.

Vertically disposed between each lower frame rail and the frame rail directly above it are a rear post 3 located slightly forward of the rear ends of the frame rails, and a front post 4 located toward the forward ends of the frame rails. Transversely disposed between the lower frame rails at the junctions of the rear posts is a lower rear crossmember 5. Transversely disposed between the upper frame rails at the junctions of the rear posts is an upper rear crossmember 6. Transversely disposed between the upper frame rails at the junctions of the front posts is a front crossmember 7 which may be utilized for the mounting of steering and other controls. Extending from a point on each lower frame rail slightly forward of the front post to the central portion of the lower rear crossmember are bottom diagonal braces 8 which provide rigidity in the horizontal plane. Extending from the ends of the lower rear crossmember to the central portion of the upper rear crossmember are rear diagonal braces 9 which provide rigidity in the transverse plane. Extending from the lower rear portion of each front post to the upper front portion of its corresponding rear post are side diagonal braces 10 which provide rigidity in the longitudinal plane.

The aforementioned main structural members together with their bracing members then constitute the rigid tapered box which is the main section of the cyclecar frame. The multiple round tubing members provide numerous mounting points to which the remaining vehicle components such as floor, seating, controls, and body may be easily attached with common U-bolts, no welding being required. Perpendicularly attached to the forward end of each of the frame rails are rectangular mounting tabs 11 having two bolt-holes each. These mounting tabs provide four generally located points for the attachment of any members, brackets, or sub-frames necessary to the front suspension.

Projecting horizontally rearward from the upper rear crossmember 6 are two parallel members 12 which shall be designated as fork tubes. These fork tubes are symmetrical about the vehicle's longitudinal axis, the distance between them being sufficient to accommodate the width of a large motorcycle, exclusive of its handlebars. Extending from the rear portion of each fork tube 12 to the end of its corresponding lower frame rail 1 are diagonal fork braces 13.

Referring to FIGS. 1 and 3, the frame of the motorcycle to be utilized as the rear section and power unit of the cyclecar is generally indicated at 14. The motorcycle is positioned between and parallel with the fork tubes 12 of the cyclecar frame such that the fork neck 15 of the motorcycle frame is positioned above the center of the upper rear crossmember 6 of the cyclecar frame.

Referring to FIG. 3, the front connecting member which shall be designated as a T-bolt, is indicated at 16. The T-bolt shall consist of a steel shaft, threaded at one end, the other end being welded to the center of one leg of a length of standard steel angle. The leg carrying the threaded shaft shall be of such width as to accommodate U-bolts which shall fit the upper rear crossmember 6. The T-bolt 16 is then attached to the top center portion of the upper rear crossmember 6 by two or more U-bolts which encircle the upper rear crossmember and extend up through the angle section of the T-bolt. This relationship of the T-bolt 16, the upper rear crossmember 6, and their connecting U-bolts 17 is shown in detail in FIG 2. Referring again to FIG. 3, the two innermost of the U-bolts 17, which shall be the two required U-bolts, are situated such that they rest against the junctions of the rear diagonal braces 9 and the upper rear crossmember 6, thereby preventing any lateral movement of the front connection.

The shaft of the T-bolt 16 then extends up through the motorcycle fork neck 15 such that the fork neck rests on the angle of the T-bolt. The shaft of the T-bolt then extends through a hole in a cap 18 which is a length of standard metal angle, such that the cap rests on top of the fork neck 15. The cap 18 and fork neck 15 are then secured to the T-bolt 16 by a nut 19.

A rigid metal cover plate 20 having four holes arranged in trapezoidal form is then bolted to the completed front connection, its lower holes aligning with the holes 21 in the front of the T-bolt angle, and its upper holes aligning with the holes 22 in the front of the cap. This trapezoidal arrangement of the cover plate bolt holes then provides transverse diagonal bracing for the front connection. This diagonal bracing provided by the cover plate coupled with the lift provided to the fork neck by its resting indirectly on the upper rear crossmember greatly reduces the torsional stress on the fork neck. In addition, the cover plate serves as a mounting point for any panels used to cover the fuel tank.

Referring again to FIG. 1, a rear strut 23 which is a rigid member of substantial integrity, is transversely disposed across the top rear section of the cyclecar frame - motorcycle combination. This strut 23 is then connected to the fork tubes 12 of the cyclecar frame and to the top rear tubes of the motorcycle frame 24 by U-bolts 25 which encircle the tubes and extend up through the strut.

With the rear strut 23 bolted in place, the fork braces 13 then provide rigidity to the fork tubes 12 in both the longitudinal and horizontal planes. The rear strut, in combination with the front connection, then provides longitudinal rigidity to the entire structure by preventing any rotation of the motorcycle about the upper rear crossmember 6, the stress on each of the two connections being approximately equal. The rear strut also serves to prevent any rotation of the motorcycle about the T-bolt in the horizontal plane, keeping it centered between the fork tubes.

Referring to FIGS. 1 and 3, it will be noted that both the height of the cyclecar frame relative to the motorcycle, and the longitudinal angle between the two structures may be varied by the placing of spacers between the upper rear crossmember and the T-bolt or between the rear strut and either the cyclecar frame's fork tubes or the motorcycle frame's top rear tubes. The variable position mounting system provided by the inclusion or exclusion of these various spacers makes the cyclecar frame easily adaptable to the vast majority of motorcycles currently in use, regardless of size.

With both the complete front connection and the rear strut secured in place, the cyclecar frame - motorcycle combination becomes an integrated structure with total rigidity in all planes and directions, no additional bracing being required. The integration provided by the overlapping of the two frames, the greater portion of the motorcycle frame being situated between the cyclecar frame's fork tubes, allows the two frame connections to transfer a considerable portion of the weight of each vehicle section to the frame of the other section. It will be noted that neither connection has necessitated any alteration to the motorcycle other than the removal of certain components such as the front fork and the seat, and that both connections are bolted connections requiring no welding.

The relatively simple bolt-together cyclecar frame-motorcycle combination with its space-frame construction therefore provides a lightweight structure of considerable integrity, which may be utilized as a basis for the construction of a cyclecar. The general configuration of the cyclecar frame and the front tabs and multiple tubing members for the mounting of the remaining components both serve to provide the builder a considerable degree of latitude in the completion of a finished vehicle.

Having thus described my invention, what I claim is:

1. A cycle car frame adapted to be connected to a motorcycle frame having the front fork removed from the fork neck thereof, said cycle car frame comprising: a main frame section having an upper rear crossmember; a pair of members attached to said crossmember and extending rearwardly therefrom, a space being present between said members adapted to contain said motorcycle frame; means at the rear ends of said members adapted to connect said members to said motorcycle frame; a shaft adapted to be received through said fork neck, means releasibly connected to the top of said shaft adapted to hold said shaft within said fork neck, a horizontal member welded perpendicularly to the lower end of said shaft; means for securing said horizontal member to said crossmember; and a rigid metal plate for bracing said shaft, said plate being connected to said shaft at a point above the level of said fork neck and also connected to one of said crossmember and said horizontal member.

2. A cycle car frame adapted to be connected to a motorcycle frame with the front fork removed from the fork neck thereof, said cycle car frame comprising: two upper and two lower longitudinal members, each of said members forming a longitudinal edge of an elongated, tapered-box-shaped configuration; two rear vertical posts and two front vertical posts interconnecting said upper and lower longitudinal members, each of said vertical posts forming a vertical edge of said box-shaped configuration; an upper front, an upper rear, and a lower rear crossmember interconnecting said longitudinal members, each of said crossmembers forming a lateral edge of said box-shaped configuration; a side diagonal brace extending from the lower end of each of said front vertical posts to the upper end of each of said rear vertical posts; a bottom diagonal brace extending from the forward end of each of said lower longitudinal members to the central portion of said lower rear crossmember; a rear diagonal brace extending from each of the ends of said lower rear crossmember to the central portion of said upper rear crossmember; two parallel horizontal members projecting rearwardly from said upper rear crossmember; a brace extending from the rear end of each of said lower longitudinal members to the rear portion of each of said parallel horizontal members; and means adapted to releasably connect said motorcycle frame in a position between said two parallel horizontal members.

* * * * *